(No Model.)
C. LANDFRIED.
VEHICLE RUNNING GEAR.
No. 596,170. Patented Dec. 28, 1897.
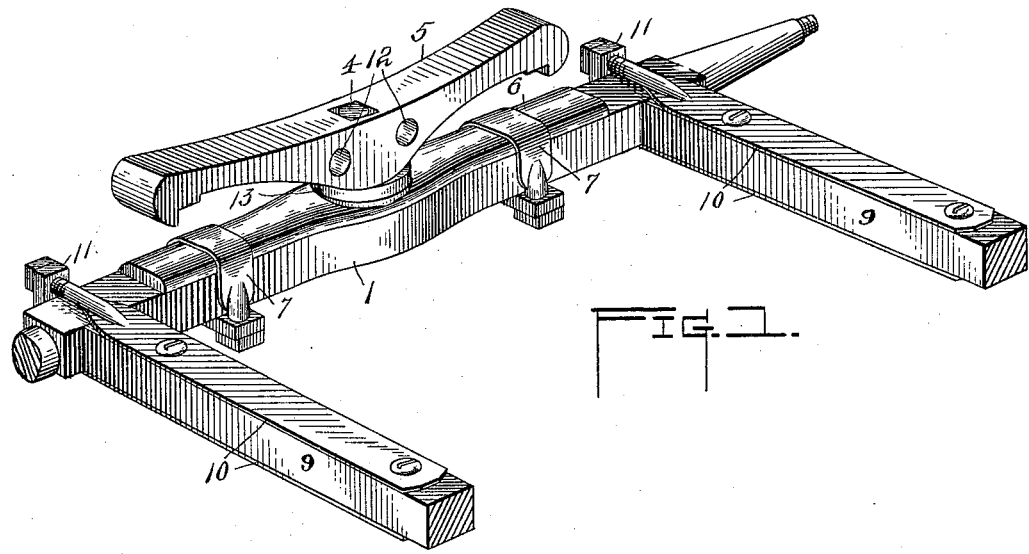
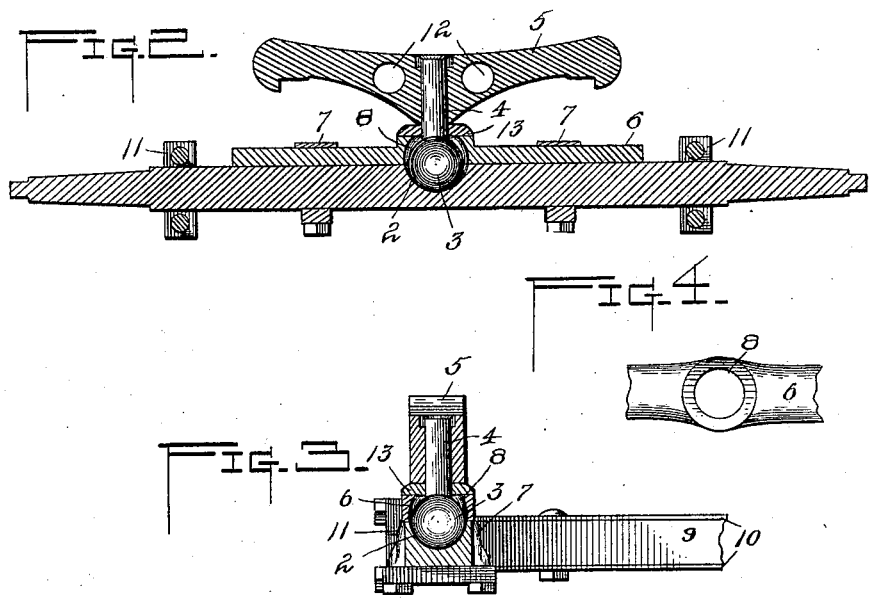
Witnesses
Inventor
Charles Landfried.
By his Attorneys.

UNITED STATES PATENT OFFICE.

CHARLES LANDFRIED, OF RAVENSWOOD, WEST VIRGINIA.

VEHICLE RUNNING-GEAR.

SPECIFICATION forming part of Letters Patent No. 596,170, dated December 28, 1897.

Application filed September 8, 1896. Serial No. 605,177. (No model.)

*To all whom it may concern:*

Be it known that I, CHARLES LANDFRIED, a citizen of the United States, residing at Ravenswood, in the county of Jackson and State of West Virginia, have invented a new and useful Running-Gear, of which the following is a specification.

The invention relates to improvements in running-gear for vehicles.

The object of the present invention is to improve the construction of vehicle running-gear, to dispense with the ordinary construction of fifth-wheel and king-bolt, and to enable a pole or a pair of thills to be rigidly fixed to the front axle, and thereby dispense with the thill-couplings of the ordinary construction and the employment of an antirattler.

The invention consists in the construction and novel combination and arrangement of parts hereinafter fully described, illustrated in the drawings, and pointed out in the claim hereto appended.

In the drawings, Figure 1 is a perspective view of a portion of a running-gear constructed in accordance with this invention. Fig. 2 is a transverse sectional view of the same. Fig. 3 is a longitudinal sectional view. Fig. 4 is a detail plan view of the plate 6.

Like numerals of reference designate corresponding parts in all the figures of the drawings.

1 designates a front axle preferably constructed of metal and provided at its upper face with a centrally-arranged socket 2, receiving a ball or head 3 and a pin 4, which depends from a head-block 5. The ball or head 3, which fits in the substantially-semispherical socket 2 of the axle, coöperates with the same to form a ball-and-socket joint, and it is secured in the socket by a metal plate or bar 6, arranged on the upper face of the axle 1 and secured to the same by clips 7. The plate or bar 6 is provided with a central opening 8, receiving the stem or pin 4, and it is hollowed out at its inner face to complete the socket of the axle. The opening 8 of the plate or bar is of sufficient size to permit the front of the axle to have a limited rocking movement on the ball sufficient to permit a pole or a pair of thills 9, which are rigidly secured to it, to be raised and lowered and to yield to the ordinary horse motion.

The thills are secured to the axle by means of clips consisting of plates 10, secured to their upper and lower faces, and provided with rearwardly-extended threaded stems receiving nuts, and connected by a tie-plate 11, arranged on the rear face of the axle. By this construction the ordinary thill-coupling, with its coupling-bolt, is dispensed with, and it also obviates the necessity of employing an antirattler at this point.

The head-block 5, which has its upper face slightly curved to receive the supporting-spring, is provided with a central vertical opening in which is secured the stem or pin 4, and it is provided with horizontal openings 12 to facilitate the attachment of the reach. The reach (not shown) is designed to be secured to the head-block, and when arranged in this manner it cannot twist, and the vehicle-body will be firmly supported in an upright position. A washer 13 is arranged on the stem or pin and is interposed between the axle and the head-block.

It will be seen that the ordinary king-bolt and fifth-wheel are dispensed with and that as the axle has a limited rocking motion a tongue or pair of thills may be readily fixed to it, thereby dispensing with the ordinary couplings and coupling-bolts, together with antirattlers.

What I claim is—

In a running-gear, the combination of a head-block designed to support the body of a vehicle and to have the reach secured to it, a stem depending from the head-block and provided with a ball, a rocking front axle capable of a limited rotary or rocking movement and provided with a central socket to receive the ball, a plate secured to the upper face of the axle and retaining the ball in the socket, and fastening devices mounted on the axle and adapted to secure a pair of thills or a pole rigidly with the axle, whereby the ordinary thill-coupling and antirattler are dispensed with, substantially as and for the purpose described.

In testimony that I claim the foregoing as my own I have hereto affixed my signature in the presence of two witnesses.

CHARLES LANDFRIED.

Witnesses:
JOHN REDMAN, Jr.,
ROBERT E. KAMPFER.